United States Patent [19]

Muranaka et al.

[11] 4,370,964
[45] Feb. 1, 1983

[54] SPARK IGNITION TIMING CONTROL SYSTEM FOR AN INTERNAL COMBUSTION ENGINE

[75] Inventors: Shigeo Muranaka, Yokohama; Kunihiko Sugihara, Tokyo; Kiyoshi Takeuchi, Yokohama, all of Japan

[73] Assignee: Nissan Motor Company, Limited, Yokohama, Japan

[21] Appl. No.: 174,923

[22] Filed: Aug. 4, 1980

[30] Foreign Application Priority Data

Aug. 6, 1979 [JP] Japan .................................. 54-100111

[51] Int. Cl.³ ............................................. F02P 5/04
[52] U.S. Cl. ................................... 123/425; 123/414; 123/422; 123/423
[58] Field of Search ............... 123/425, 435, 414, 419, 123/422, 423

[56] References Cited

U.S. PATENT DOCUMENTS 4,116,173 9/1978 McDougal et al. ................. 123/425
4,233,944 11/1980 Omori et al. ........................ 123/425
4,275,692 6/1981 Takeda et al. ...................... 123/425

Primary Examiner—Charles J. Myhre
Assistant Examiner—Andrew M. Dolinar
Attorney, Agent, or Firm—Schwartz, Jeffery, Schwaab, Mack, Blumenthal & Koch

[57] ABSTRACT

Disclosed is a spark ignition timing control system for a split type multi-cylinder internal combustion engine which operates to advance the spark advance angle of a specific combustion chamber relative to other combustion chambers. The control system generally comprises a means for detecting a knocking condition and generating knocking signal so as to retard spark advance angle corresponding to knocking of engine and a means for detecting engine load condition and thereafter advancing the spark advance angle of the specific combustion chamber when the engine is driven at relatively high loads.

12 Claims, 4 Drawing Figures

SPARK IGNITION TIMING CONTROL SYSTEM FOR AN INTERNAL COMBUSTION ENGINE

BACKGROUND OF THE INVENTION

1. Field of the Invention

The present invention relates generally to a spark ignition timing control system for feedback controlling spark ignition timing of an internal combustion engine. More specifically, the present invention relates to a spark ignition timing control system for a split type multi-cylinder internal combustion engine for advancing spark ignition timing of one combustion chamber relative to the remained combustion chambers in order to improve the engine characteristics with regard to knocking.

2. Background of the Invention

Generally, knocking of an internal combustion engine engine will cause the shortening of its life time. A substantive knocking condition is permitted to continue, the engine will be damaged or injured and its durability will be generally degraded. On the other hand, from the view point of fuel economy and maximizing engine output characteristics, it is desirable to maintain the engine at a trace knocking condition. As is well-known to those skilled in the art, adjustments can be made to the spark advance angle of a spark ignition system for causing knocking on the internal combustion engine. In general, advancement of the spark advance angle, results in a corresponding increase in knocking condition in the engine. Therefore, control of knocking condition can be accomplished by controlling the spark advance angle to correspond to engine knocking conditions and other parameters. In the prior art, there have been developed and proposed various system for keeping the internal combustion engine in a lightly or trace knocking condition by feedback controlling the spark advance angle in order to improve fuel economy and maximize engine output characteristics.

It is also well known that under the knocking condition, engine vibration rapidly increase depending on variations on the internal pressure in the combustion chamber. The engine vibration frequency corresponding to knocking conditions is generally within a range of 6 to 9 KHz. Utilizing this characteristics of the engine, there have been proposed various systems for detecting knocking conditions of an engine by determining the engine vibration. For detecting the engine vibration, there may be provided a vibration sensor on the internal combustion engine which detects the above-mentioned specific range of engine vibration. The detected vibration frequency signal is converted into an analog value which is smoothed and thereafter passed to a comparator where it is compared with the vibration element of the specific frequency range to generate a signal. The signal is integrated per every given crank rotational angle. When the integration value exceeds a predetermined value, the engine is regarded as it being driven in a knock condition and a knocking signal is generated. Corresponding to this knocking signal, the spark advance angle is feedback controlled.

In the split type multi-cylinder internal combustion engine having a plurality of engine combustion chambers, it is preferable to advance the spark ignition timing of one of the combustion chambers, which is hereinafter referred as the "specific chamber", relative to the remaining channels. By so doing, the specific chamber is apt to cause knocking in advance to remained chambers entering into a knocking condition. Adjacent to the specific chamber there is positioned a vibration sensor for determining magnitude of engine vibration and thereby for detecting a knocking condition of the engine. This operation is based on the principle that a specific frequency or magnitude of vibration is generated in a combustion chamber while the chamber is being driven in a knocking condition.

Alternatively, in the above-mentioned system for sensing knocking condition of the engine, even when the engine is unstable driven, for example, under low-load condition where the intake vacuum of an intake manifold is relatively high, the spark ignition advance angle is varied in the specific chamber as well as the remaining chambers. This may cause increasing unstability of the engine and thereby degrade the drivability thereof. Further this will also affect the fuel economy.

SUMMARY OF THE INVENTION

Therefore, it is an object of the present invention to provide a spark ignition timing control system for feedback controlling the spark ignition angle of such a split system multi-cylinder internal combustion engine, which advances the spark ignition advance angle of one of the combustion chambers relative to the remaining chambers under relatively high engine load condition and interrupts advancing of the advance angle of the specific chamber under relatively low engine load condition.

To accomplish the above-mentioned and other objects, there is provided a spark ignition timing control system according to the present invention which can advance the spark advance angle of a specific chamber relative to the other combustion chambers. The control system generally comprises a means for detecting a knocking condition of the engine and generating a knocking signal so as to retard spark advance angle corresponding to the detected knocking and a means for detecting engine load conditions and advancing the spark advance angle of the specific chamber when the engine is driven under relatively high loads.

BRIEF DESCRIPTION OF THE DRAWINGS

The present invention will become more fully understood from detailed description given below, and from accompanying drawings of the preferred embodiments of the present invention, which, however, are not to be taken limitative of the present invention in any way, but are for the purpose of elucidation and explanation only.

In the drawings.

DESCRIPTION OF THE PREFERRED EMBODIMENT

Figure 1:
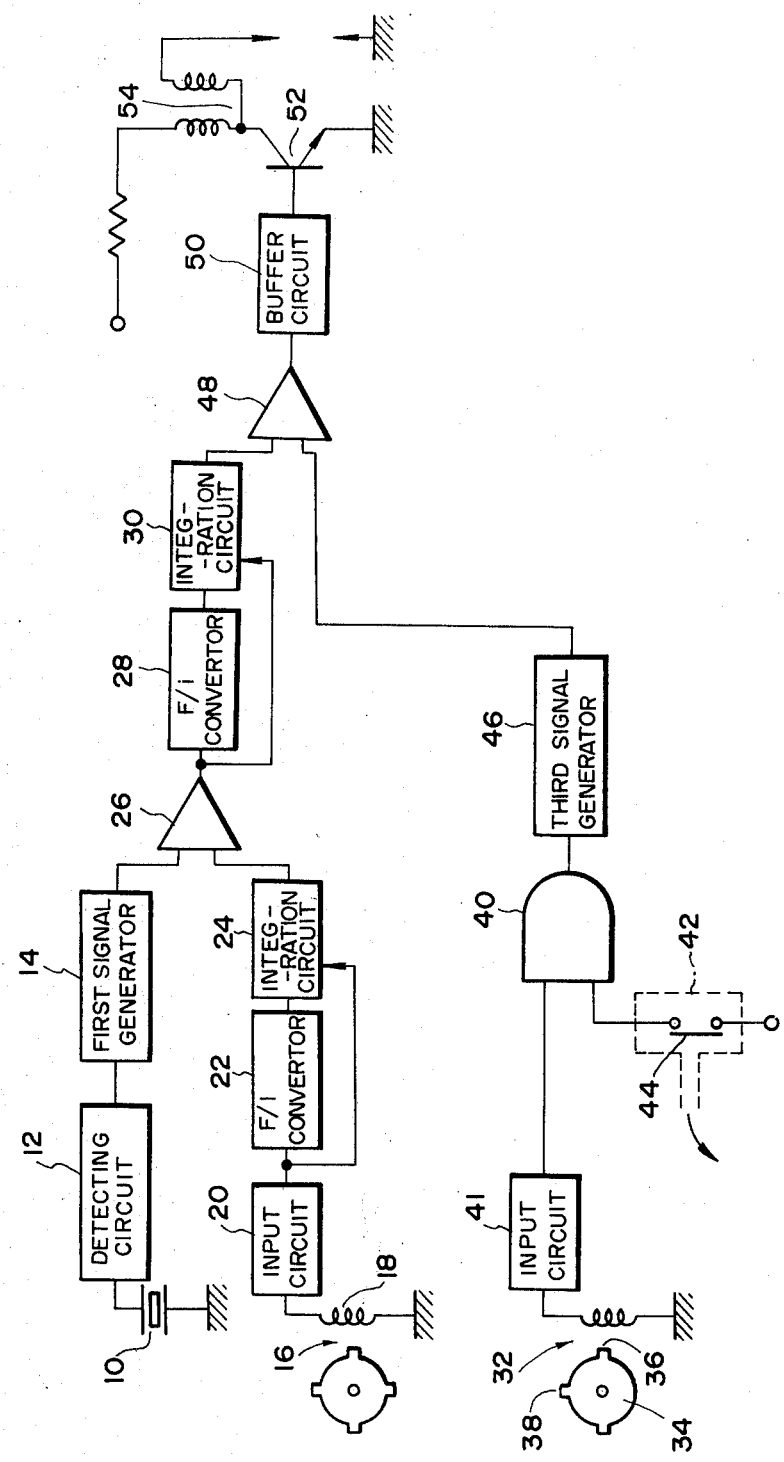
FIG. 1 is a schematic diagram of a preferred embodiment of a spark ignition timing control system according to the present invention.

Referring now to the drawings, particularly to FIG. 1, there is illustrated a preferred embodiment of a spark ignition timing control system according to the present invention. A vibration sensor 10 is provided on an engine cylinder of a split type multi-cylinder internal combustion engine (not shown) adjacent one of the combustion chambers which has a spark advance angle which is to be advanced relative to the remained combustion chambers. Generally, the internal combustion engine generate a specific frequency range of vibration in response to knocking condition caused therein. Normally, vibrations in the range of approximately 6 KHz to 9 KHz will be generated while the engine is operated in a knocking condition. Therefore, the vibration sensor 10 is provided which has a resonating frequency within the above-mentioned frequency range. The vibration sensor 10 resonates to the engine vibration within the specific frequency range to detect a knocking condition of the engine and thereby generate a sensor signal.

The sensor signal generated by the vibration sensor 10 is fed to a knocking detecting circuit 12 in which the engine knocking condition is distinguished by presence of the sensor signal. When the knocking detecting circuit 12 detects the engine knocking condition, the circuit 12 generates an output to be fed to an first signal generator 14. The first signal generator 14 generally acts as capacitor to generate a signal having an electric voltage corresponding to the output of the circuit 12. The signal generated by the first signal generator 14 is substantially proportional to frequency of the occurrence of knocking in the engine and is indicative of a retarding ratio of the spark advance angle.

On the crank shaft of the internal combustion engine there is provided a crank angle sensor 16 which may include, for example, an electromagnetic pick up 18. At every predetermined crank angles, the crank angle sensor 16 generates a crank pulse which defines the spark ignition timing.

It should be noted that in the shown embodiment, the crank angle sensor 16 is illustrated as for use with a four cylinders engine but the number of cylinders is not essential for the present invention, and therefore this invention should not be considered as to be specified to four cylinder type engines.

The crank pulse generated by the crank angle sensor 16 is formed into a saw-tooth wave signal through an input circuit 20, F/i converter 22 and an integration circuit 24. The electromagnetic pick up is rotated in syncronism with engine revolution and the frequency of the saw-tooth wave signal is the same as the frequency of ignition spark timing. At the rising point of the saw-tooth wave signal, a reset signal is also generated and fed to the integration circuit 24. Thus, the saw-tooth wave signal indicates spark ignition timing.

The signal having electric voltage generated by the first signal generator 14 and being proportional to frequency of occurrence of knocking and the saw-tooth wave signal generated by through the input circuit 20, F/i converter 22 and integration circuit 24 are fed into a comparator 26. In the comparator 26, the signal of the first signal generator 14 and the saw-tooth wave signal are compared so that the comparator produces a pulse signal which has pulse widths corresponding to a retarding ratio of the spark advance angle. Throught an F/i converter 28 and an integration circuit 30, a second signal is generated with the electric voltage thereof corresponding to the pulse width of the pulse signal. The signal outputted through the F/i converter 28 and the integration circuit 30 is indicative of a retarding ratio of the spark advance angle.

On the crank shaft of the engine, there is further provided another crank angle sensor 32 having a rotation element 34 rotating in syncronism with the engine revolution. The crank angle sensor 32 also has an electromagnetic pick up 36. The rotation element 34 is provided with magnetic pole projections 38 each corresponding to a predetermined crank angle. However, the rotation element at space 34 is omitted, i.e., there is no magnetic pole projection at the portion corresponding to a specific crank angle which corresponds to a specific combustion chamber to be supplied on spark ignition advance angle which is advanced relative to remained combustion chambers. The crank pulse generated by the crank angle sensor 32 is fed to an AND circuit 40. To the AND circuit 40 is also inputted an intake vacuum sensor signal generated by an intake vacuum sensor 42. The vacuum sensor 32 has a contact 44 which is closed in response to relatively low vacuum pressure, i.e. in response to relatively high engine load condition. When the engine is driven under relatively low load condition, the contact 44 is opened to generate a low level sensor signal. If the low level sensor signal is inputted to the AND circuit 40 from the vacuum sensor 42, the gate of the AND circuit 40 is kept in closed position and therefore no output from the AND circuit 42 is not fed to a third signal generator 46. On the other hand, when the engine is driven under relatively high load and therefore high level sensor signal is generated and fed into the AND circuit, the gate of the AND circuit 40 is opened to input the output thereof to the second signal generator 46. In response to input from the AND circuit 40, the third signal generator 46 generates a third signal. If the value of the third signal corresponds to the specific chamber, the value of the third signal is low and if the value of signal corresponds to the remaining combustion chambers, the value thereof is high. The output of the second signal generator 46 is fed to a comparator 48 as a reference value to be compared with the second signal indicative of a retarding ratio of spark timing.

As stated above, since the third signal of the third signal generator 46 corresponding to the specific chamber is lower than that of the remaining chambers, the fundamental level of the third signal as the reference value in the comparator 48 is varied so that it advances the spark advance angle of the specific chamber relative to that of remaining chambers. It should be noted that the retarding or advancing ratio of the spark advance angle is constant to both the specific chamber and the other chambers. If the engine is driven under relatively low load condition and therefore the AND circuit 40 does not generates output, the output voltage of the third signal generator 46 becomes the same for both the specific chamber and the remaining chambers. Thereupon, the reference voltage corresponding to the chambers other than the specific chamber is lowered to the same level as the voltage corresponding to the specific chamber. Therefore, the spark advance angles of the other chambers are advanced to the same level of the specific chamber.

The output of the comparator 48 is fed through a buffer circuit 50 to a power transistor 52. The power transistor 52 then becomes operative to generate electric power for activating as spark ignition coil 54.

Thus, according to the embodiment of the spark ignition timing control system as illustrated hereabove, the spark advance angle for each combustion chamber can be feedback controlled corresponding to the frequency of the occurrence of knocking caused by the engine. By this, the spark advance angle for each combustion chamber can be maintained to cause light knocking therein for maximizing engine output characteristics and for fuel economy. Further, in the foregoing embodiment, by advancing the spark advance angle of the specific combustion chamber to increase possibility of causing knocking, engine knocking conditions can be detected more effectively. This will also increase the accuracy of detecting knocking conditions to effectively control spark timing. On the other hand, when the engine is driven under relatively low load conditions, the spark advance angle for each of other combustion chamber is advanced to the same level of the specific chamber and thereby all the chambers of the engine are driven at the same spark timing. This can avoid instability of engine operation. Also, advancing the spark advance angles of the other chambers will result in improving combustion characteristics.

Figure 2:
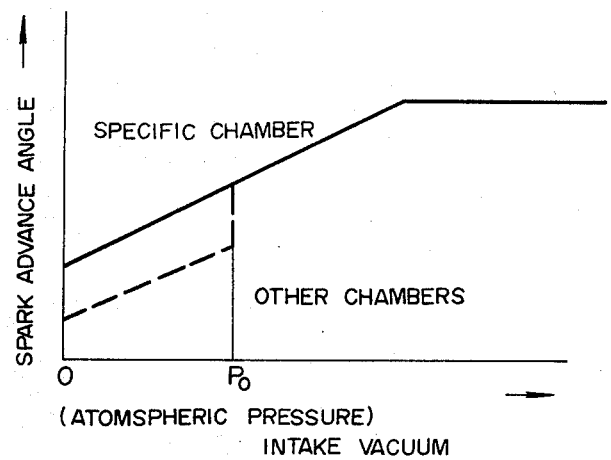
FIG. 2 is a graph showing relationship between spark advance angle and intake vacuum varied by the control system of FIG. 1.

FIG. 2 shows a relationship between the intake vacuum and spark advance angle. In FIG. 2, $P_0$ denotes a threshold valve between the low load conditions and high load condition of the engine. Variations of spark timing of the specific combustion chamber is indicated by solid line and variations of spark timing of the other chambers is indicated by broken line. As seen from FIG. 2, if the intake vacuum is lower than $P_0$, the spark advance angles of the specific combustion chamber and the remainders are varied. Subsequently, if the intake vacuum is higher than $P_0$, the spark advance angles of the other combustion chambers are advanced to the same level of the specific chamber.

Figure 3:
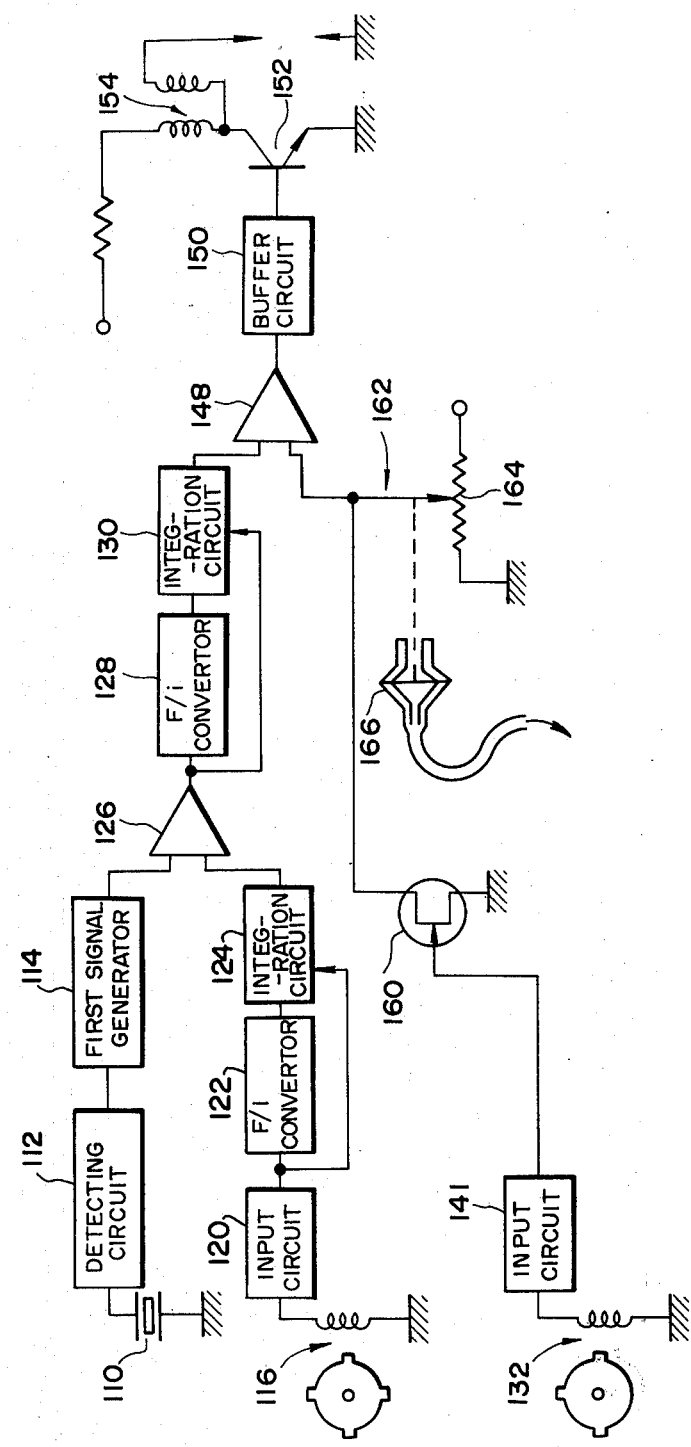
FIG. 3 is a schematic diagram of another embodiment of the spark ignition timing control system according to the present invention.

Referring to FIG. 3, there is illustrated another embodiment of a spark timing control system according to the present invention. In a manner similar to the foregoing embodiment, there is provided a vibration sensor 110 for determining engine vibration and when the engine is driven in knocking condition, the sensor 110 detects a specific frequency range of vibration and generates a sensor signal. Through a detecting circuit 112 and a first signal generator 114, the sensor signal is converted into a signal indicative of electric voltage proportional to magnitude of knocking caused in the engine. The signal generated in the signal generator 114 is inputted to a comparator 126 so as to be compared with a saw-tooth wave signal generated through a crank angle sensor 116, an input circuit 120, F/i converting circuit 122 and an integration circuit 124. The comparator 126 modulates a pulse signal which has pulse width corresponding to a retarding ratio of spark advance angle indicated in the signal of the signal generator 114. The pulse signal is fed to a comparator 148 through a F/i converter 128 and an integration circuit 130.

A transistor 160 operable for generating an electric voltage corresponding to a crank angle signal generated and fed thereto from another crank angle sensor 132, is connected to the comparator 148. The crank angle sensor 132 has substantially the same construction as the foregoing crank angle sensor 32. The output voltage of the transistor 160 is corrected by the correcting circuit 162. The correcting circuit comprises a variable resistor 164 which is actuated to vary the resistant value by a diaphragm means or the like responsive to intake vacuum pressure flowing through the intake manifold of the engine. The corrected crank angle signal is fed to the comparator 148. In the comparator 148, the signal fed from the transistor 160 acts as reference value to be compared with the signal fed from the integration circuit 130 which indicates the retarding ratio of the spark advance angle.

Figure 4:
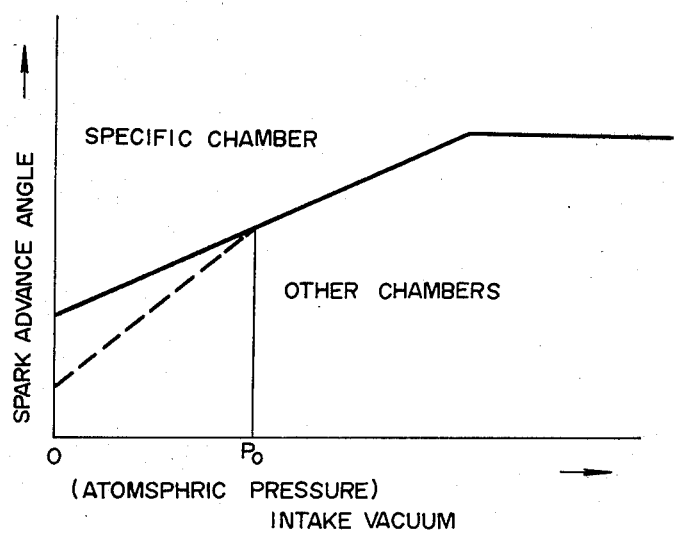
FIG. 4 is a graph showing relationship between spark advance angle and intake vacuum varied by the control system of FIG. 3.

As shown in FIG. 4, in this embodiment, when the intake vacuum is smaller than the given value and therefore the engine load is relatively higher, the spark advance angle of the specific combustion chamber is advanced relative to the remained chambers. Therefore, efficiency of sensing a knocking condition of the engine is increased.

FIG. 4 shows a relationship between the intake vacuum and spark advance angle as similar to FIG. 2. In FIG. 4, $P_0$ denotes a threshold between a low load condition and high load condition of the engine, and variations of spark timing of the specific chamber are indicated by a solid line and variations the spark timing of the other chambers are indicated by a broken line. In a manner similar to FIG. 2, if the intake vacuum is lower than $P_0$, the spark advance angle of the specific combustion chamber and the remaining chamber is varied. As seen from FIG. 4, the difference in the spark advance angle between the specific chamber and the remaining chamber is gradually reduced according to the increasing of intake vacuum and becomes zero at the threshold value $P_0$.

According to this embodiment of the present invention, since the difference between spark advance angles is gradually varied inversely proportionally to the value of intake vacuum, the system efficiency for detecting a knocking condition of the engine is rather high at relatively high engine load conditions.

As discussed hereinabove, there has been provided an improved spark ignition timing control system for an internal combustion engine in accordance with the present invention that satisfied all of the aims and objective set forth hereinabove. It should be understood that further modifications and variations may be made in the present invention without departing from the principles of the present invention as set forth herein and the invention should be defined by the scope of the appended claims.

What is claimed is:

1. A spark ignition timing control system for an internal combustion engine having a plurality of combustion chambers comprising:
  a knock detection means for generating a first signal indicative of a retarding ratio of spark advance angle which corresponds to a magnitude of detected knocking; and
  a means for detecting an engine load condition and operable to distinguish whether the engine load is higher than a predetermined level and to retard the spark advance angle of an ignition signal for a first group of said chambers when the detected load is higher than said predetermined level whereby the spark advance angle of a second group of said chambers, comprising at least one of said chambers, becomes advanced relative to the first group under high load conditions.

2. A spark ignition timing control system as set forth in claim 1, wherein said load detection means includes a vibration sensor provided on the engine adjacent to said second group of combustion chambers whose ignition signal is advanced relative to said said first group, said vibration sensor resonating at a specific frequency range of engine vibrations corresponding to an engine knocking condition and a means for determining a retarding ratio of spark advance angle based on a detected magnitude of said engine knocking condition and relative to an engine crank rotation angle.

3. A spark ignition timing control system as set forth in claim 1 or 2, wherein said detecting means includes a sensor means for determining engine load condition and for generating a sensor signal, said detecting means further including means for distinguishing said engine load condition based on said sensor signal for interrupting retarding of said spark advance angle of said ignition signal to said first group of combustion chambers relative to said second group of chambers.

4. A spark ignition timing control system as set forth in claim 3, wherein said detecting means advances spark advance angle of ignition signals to said first group of chambers until equal to that of said ignition signal to said second group of chambers when the engine load condition is lower than the predetermined level.

5. A spark ignition timing control system for a multi-cylinder internal combustion engine having a plurality of combustion chambers therein, said system comprising:
- at least one vibration sensor positioned on said engine, said at least one sensor being positioned adjacent a first group of said chambers comprising at least one chamber for detecting engine vibrations which correspond to a knocking condition;
- a first means for detecting signals generated by said vibration sensor and for generating a pulse signal having a pulse width corresponding to a retarding ratio of spark advance determined from said detected vibrations;
- an engine load sensor for detecting an engine load condition; and
- a second means for distinguishing whether the detected engine load is higher than a predetermined level, and operable to provide a retarded spark angle ignition signal to remaining chambers other than said first group when the engine load is higher than said predetermined level whereby the ignition signal to said first group of chambers is advanced relative to said remaining chambers, said second means being operable to advance the spark angle of the ignition signal to said remaining chambers to on the order of the spark advance angle of said first group of chambers when the detected engine load is lower than said predetermined level.

6. A spark ignition timing control system as set forth in claim 5, wherein said engine load sensor is a sensor for determining intake vacuum pressure flowing through an intake manifold of the engine.

7. A spark ignition timing control system as set forth in claim 5 or 6, wherein said second means further includes a comparator circuit for comparing said pulse signal indicative of a retarding ratio of said spark advance angle and a signal detected by said engine load sensor indicative of engine load condition.

8. A spark ignition timing control system for an internal combustion engine having a plurality of combustion chambers, comprising:
  (a) a first means for generating ignition timing signals;
  (b) a second means for detecting an engine knocking condition and operable to retard said ignition timing signals corresponding to a magnitude of said detected engine knocking condition; and
  (c) a third means for detecting engine load and distinguishing whether the detected engine load is higher than a predetermined level and operable to pass said ignition timing signals to a first group of chambers, comprising at least one of said chambers, and to retard said ignition timing signal to a second group of said chambers when the detected engine load is higher than said predetermined level whereby said ignition timing signals to said first group of chambers becomes advanced relative to said second group of chambers.

9. A spark ignition timing control system as set forth in claim 8, wherein said second means includes a vibration sensor provided on the engine, adjacent to said first group of chambers whose ignition timing signals are advanced relative to said second group, said vibration sensor resonating at a specific frequency range of engine vibrations corresponding to an engine knocking condition.

10. A spark ignition timing control system as set forth in claim 8 or 9, wherein said third means retards said ignition timing signals with respect to said second group of chambers by a constant predetermined angle under high load condition.

11. A spark ignition timing control system as set forth in claim 8 or 9, wherein said third means retards said ignition timing signals with respect to said second group of said chambers by an increasing angle corresponding to the magnitude of said detected engine load.

12. A spark ignition timing control as set forth in claim 8, wherein said third means includes an engine load sensor for detecting intake vacuum pressure flowing through an intake manifold of the engine.

* * * * *